Jan. 5, 1937.  A. B. BASSOFF  2,066,758

INFINITELY VARIABLE SPEED MECHANICAL TRANSMISSION SYSTEM

Filed April 18, 1934

A. Bain Bassoff
INVENTOR.

BY

ATTORNEY.

Patented Jan. 5, 1937

2,066,758

UNITED STATES PATENT OFFICE 2,066,758

INFINITELY VARIABLE SPEED MECHANICAL TRANSMISSION SYSTEM

Arthur Bair Bassoff, Brooklyn, N. Y.

Application April 18, 1934, Serial No. 721,098

5 Claims. (Cl. 74—283)

It is an object of my invention to provide a laminated gear wheel structure of simple positive and durable type and to provide a plurality of correlated gears therefore which will give a pure mechanical infinite speed variable power transmission system. Such a gear I designate as a regenerative gear.

A further object is to provide a transmission capable of transmitting power in either direction, relative to the direction of rotation of the driving shaft member. I prefer in one embodiment also to have my drive member and driven member in alignment so as to be able to insert my transmission in a continuous shafting, if desired. I am not limited to this arrangement, however, as it will appear that my drive shaft may, in some embodiment, be at a right or other angle to my driven shaft.

My device is suitable for any industrial, automotive or other application or use where variable speed power transmission is required.

By infinitely variable, I mean that between limits, the speed ratio can be varied by infinitesimal gradations and in both directions of rotation. By pure mechanical, I mean without the intervention or use of the laws of hydraulics or electromagnets.

The principal feature of this invention remains the regenerative laminated gear wheel adapted to automatically generate its own teeth.

It is my further object to teach the use of a regenerative laminated gear wheel in such a transmission system in which the laminated portion is on the inside thereof (internal).

In addition, I disclose a variable speed transmission system wherein the speed of rotation of the power output shaft may be infinitely varied in both directions of rotation while the power input shaft maintains constant speed in one direction of rotation. This is achieved through the association of epicyclic gearing with the variable speed portion of the mechanism.

My further and important object is to teach the use of such a regenerative laminated gear wheel, with means to restore the laminations to non-tooth (flat, level or flush) position when not in engagement with its mating gears.

My invention will be more readily understood by reference to the accompanying drawing in which like numbers refer to like parts in the several views.

Figure 1:
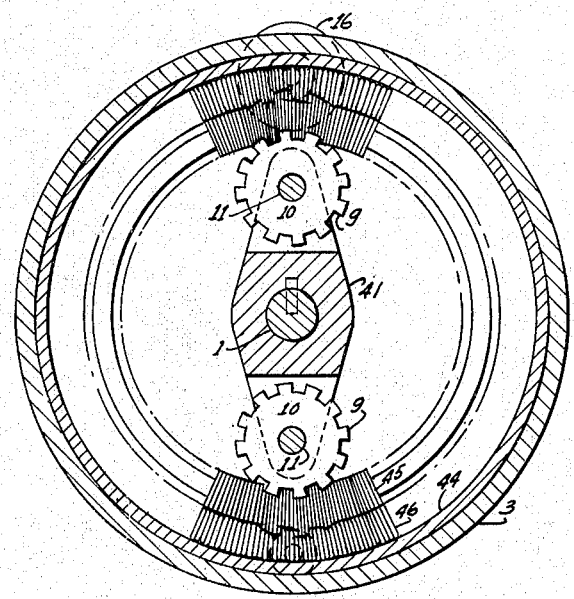
Figure 2:
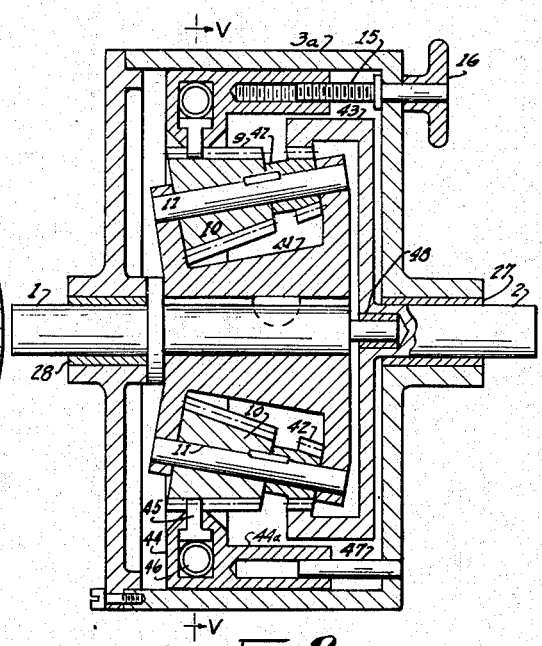

In Figure 1, I show a sectional view along the plane V—V of Figure 2 of my invention in which the regenerative laminated ring gear is non-rotating and slidable.

In Figure 2, I show a sectional elevation of my invention in which the regenerative laminated ring gear is non-rotating and slidable, and the rotating bevels are in a revolving spider. The regenerative laminated gear wheel is of the internal type and provided with flexible resilient means for returning the laminations to non-tooth position.

Figure 3:
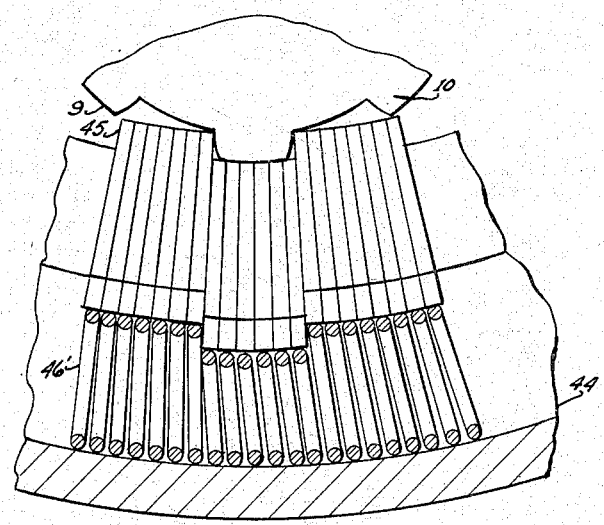

In Figure 3, I show an enlarged view of the manner in which the laminations are correlated with the resilient return means.

Figure 4:
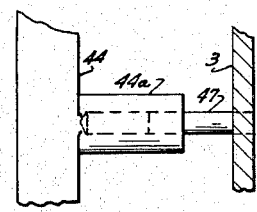

In Figure 4, I show the means employed in one embodiment to prevent the rotation of the laminated gear wheel, in other words, to hold it in position.

In Figure 2, the input or constant speed shaft 1 is keyed to spider 41 which carried shafts 11. Journalled upon shafts 11 are bevel gears 10 which mesh with the laminations 45 of the internally laminated gear 44. The shafts 11 are inclined at an angle in spider 41 so that the faces of bevel gears 10 shall be parallel with the axis of shaft 1. Bevel gears 9 are keyed to gear wheels 42, which mesh with internal gear wheel 43. The gear wheel 43 is preferably made integral with variable speed output shaft 2. The output and input shafts are journalled in bearings 27 and 28, which are held in housing 3 which encloses the entire operating mechanism. An additional bearing 48 serves to maintain axial alignment between the shafts 1 and 2. The laminated ring gear is composed of a shell 44 which is grooved circumferentially to contain the laminations 45 and the resilient backing 46. The shell 44 is provided with a hub 44a in which pin 47 slides. Pin 47 is fixed to housing 3. The shell 44 is also provided with an extended threaded hub which holds screw 15. The screw 15 is journalled in housing 3 and is provided with a handwheel 16.

This variable speed mechanism operates thusly. When shaft 1 is revolved, it carries the spider 41 along. This causes the gears 10 to revolve in a direction opposite to the rotation of the shaft 1. Gears 10 revolve because the teeth 9 thereof force the laminations 45 away from the center of ring gear 44 and thereby compressing resilient member 46. The laminations which are opposite the spaces existing between teeth 9 on gears 10 are held in their original position. Consequently, a mating gear tooth condition is established by the laminations and this mating gear tooth condition causes gears 10 to revolve. This is more clearly illustrated in Figure 3.

Since gears 10 are keyed to gears 42, the gears 42 revolve with gears 10 and gears 42, being in mesh with gear 43 cause that gear to revolve which results in revolution of output shaft 2.

I wish to call attention to the fact that gears 10, 44, 42 and 43 together with their corresponding shafts form what is commonly known to the art as a compound epicyclic gear train. In such a gear train, if the pitch diameters of the internal gears 43 and 44 are alike, then the speed and direction of rotation of gear 43 relative to shaft 1, will depend upon the ratio in diameter between gears 10 and 42.

If the operating diameters of gears 10 and 42 are alike, there will be no rotation of gear 43. If the operating diameter of gear 10 is greater than that of gear 42, gear 43 will revolve in the same direction as shaft 1 at some speed depending upon the ratio existing between gears 10 and 42 and if the operating diameter of gear 10 is less than that of gear 42 then gear 43 will revolve in a direction opposite to shaft 1 at some speed, depending upon the ratio existing between gears 10 and 42. The preferable construction of gears 10 is such that the large end is considerably larger than gear 42.

Since gears 10 are inclined so that their faces are parallel with the axis of rotation, it is clear that gear 44 containing lamination 45 can be moved to any position along gears 10, thus bringing into engagement different diameters of gears 10. Since the speed of gear 43 depends upon the ratio existing between gears 10 and 42 and since varying diameters of gears 10 can be brought into action, therefore the speed of gear 43 will be varied while the speed of shaft 1 remains constant. There are many different forms of epicyclic gear trains. The principal characteristic of all epicyclic gear trains is that one of the members is non-rotatable and other rotatable members mesh therewith. By substituting the laminated type of gear for the non-rotatable unit in any epicyclic gear train and by substituting bevel gears, as previously described for the rotatable members meshing with said non-rotatable gear I can convert any epicyclic gear train into an infinitely variable gear mechanism.

Having thus described my invention, what I claim is:

1. A variable speed transmission mechanism comprising a driving and driven shafts, bevel gears having their outermost teeth at contact point parallel with the axis of the driving shaft, a non-rotating axially slidable gear containing a continuous plurality of radially slidable laminations, epicyclic gear connections for converting the rotation of said bevel gears into rotation of the driven shaft, variable means for sliding said non-rotating laminated gear into operative engagement with different portions of said bevel gears, means for restraining the said laminations from sliding in one direction relative to the central axis of said non-rotating gear, teeth on the said bevel gears for causing the said laminations to slide and resilient means for returning the said laminations to their original position when disengaged from the said teeth on the bevel gears.

2. A variable speed transmission mechanism comprising a driving and driven shafts, a gear wheel comprising a continuous plurality of laminations radially disposed therein, means for restraining the said laminations from sliding in one direction; bevel gears having their outermost teeth at contact point parallel to the exposed faces of the said laminations, teeth on the said bevel gears to engage with and cause the said laminations to slide and resilient means for returning the said laminations to their original position when disengaged from the said teeth on the said bevel gears, means for varying the relative position of the said bevel gears and the said laminated gear and means for transmitting the resultant rotation of said bevel gears to the driven shaft.

3. A variable speed transmission mechanism comprising a driving and driven shafts, a gear wheel comprising a continuous plurality of laminations radially disposed therein, means within the said gear wheel for restraining the said laminations from sliding in one direction; bevel gears having their outermost teeth at contact point parallel to the exposed faces of the said laminations, teeth on the said bevel gears to engage with and cause the said laminations to slide and resilient means for returning the said laminations to their original position when disengaged from the said teeth on the said bevel gears, means for varying the relative position of the said bevel gears and the said laminated gear and means for transmitting the resultant rotation of said bevel gears to the driven shaft.

4. A variable speed transmission mechanism comprising a driving and driven shafts, a gear wheel comprising a continuous plurality of laminations radially disposed therein, means within the said gear wheel for restraining the said laminations from sliding in one direction; bevel gears having their outermost teeth at contact point parallel to the exposed faces of the said laminations, teeth on the said bevel gears to engage with and cause the said laminations to slide and resilient means within the said laminated gear for returning the said laminations to their original position when disengaged from the said teeth on the said bevel gears, means for varying the relative position of the said bevel gears and the said laminated gear and means for transmitting the resultant rotation of said bevel gears to the driven shaft.

5. A variable speed transmission mechanism comprising a driving and driven shafts, an internal laminated gear, bevel gears meshing therewith and having their outermost teeth at contact point substantially with the axis of the driving shaft, a non-rotating axially slidable gear containing a continuous plurality of radially slidable laminations, epicyclic geared connections for converting the rotation of said bevel gears into rotation of the driven shaft, variable means for sliding said non-rotating laminated gear into operative engagement with different portions of said bevel gears, means for restraining the said laminations from sliding in one direction relative to the central axis of the non-rotating gear, teeth on the said bevel gears for causing the said laminations to slide and resilient means within the said laminated gear for returning the said laminations to their original position when disengaged from the said teeth on the bevel gears.

ARTHUR BAIR BASSOFF.